United States Patent Office 3,825,513
Patented July 23, 1974

3,825,513
EMULSION BASES AND EMULSIONS
Fritz S. Rostler, Berkeley, Calif., assignor to Phillips Petroleum Company, Bartlesville, Okla.
No Drawing. Continuation-in-part of applications Ser. No. 690,572, Dec. 14, 1967, now abandoned, Ser. No. 773,186, Nov. 4, 1968, and Ser. No. 714,424, Mar. 20, 1968, now Patent No. 3,577,250. This application Feb. 18, 1971, Ser. No. 116,685
Int. Cl. C08f 45/52; E01c 7/36
U.S. Cl. 260—28.5 AS
7 Claims

ABSTRACT OF THE DISCLOSURE

Emulsions suitable for the bonding of aggregates containing as their non-aqueous oil phase either a solution of a poly(styrene)-poly(diene)-poly(styrene) block copolymer in which the solvent may be a petroleum oil substantially of the composition of ASTM Extender Oils 101 or 102 diluted with a volatile solvent, or an asphalt solution, and also mixtures of such emulsions containing the two phases.

---

This application is a continuation-in-part of application Ser. No. 690,572, filed Dec. 14, 1967, abandoned, Ser. No. 773,186, filed Nov. 4, 1968, and Ser. No. 714,-424, filed Mar. 20, 1968 now Pat. No. 3,577,250.

BACKGROUND OF THE INVENTION

This invention relates to the composition and the use of a new family of emulsion products for geotechnic purposes, particularly for the stabilization of soils against the adverse effects of wind, water and mechanical abrasion such as traffic.

Many attempts have been made to consolidate earth surfaces to withstand the erosive effects of wind, rains, surface water and mechanical abrasion. The principal difficulties encountered in such attempts are due to the wide differences of soils in chemical make-up, particle size and particle shape.

Soils are usually classified by particle size and range from fine-grained clays and silts to large rocks. Dislocation and diminution of particles or of particle agglomerates are the primary causes of deterioration of natural soils or man-made soil structures.

In all previous approaches to the problem of soil stabilization, the aim was either to embed the soil in a matrix such as in a pavement, or to confine the soil mechanically, or to compact it into an interlocking arrangement holding the particles together by friction.

A multitude of products is employed to assist in accomplishing the various objectives. These products are bonding agents which agglomerate individual soil particles and hold them firmly in place to form cohesive structures. These structures have in common that they are composed of individual particles which are interlocked mechanically or welded into coherent bodies by a bonding agent so that they will resist displacement when exposed to aging or mechanics of disruptive forces which tend to destroy the coherence of the bonded structures. The soil stabilizing agents are either mechanically mixed into the soil or sprayed onto the soil. The latter procedure is known as spray-on application, which is preferred for reason of economy. Many attempts have been made to combine bonding agents and take into account the difference in soil properties or to achieve a synergistic effect. The desired combination of effects could not be achieved by applying mixtures of individual ingredients because soils have preferential affinity for different products. This disturbing phenomenon becomes particularly evident in spray-on applications because soil functions as a stratifying agent and, similar to a chromatographic column, separates the ingredients in layers as the mixture permeates the soil. The separation of ingredients is most evident when employing mixtures of emulsions.

SUMMARY OF THE INVENTION

I have found that I may produce a family of bonding agents which may be applied at ordinary atmospheric temperatures, directly or in combination with solvents, and preferably, in emulsion form, to the structure to form directly highly useful bonds for the aggregates of the structure. They may, however, also be employed in the above forms as additives to soil or aggregates which have theretofore been bound together by other bonding agents.

It is in accord with the findings outlined above that the present invention distinguishes between three units which comprise the new emulsions. These fundamental units are:

I. The emulsion base,
II. The emulsion concentrate,
III. The emulsion.

The emulsion base (I) forms the non-aqueous phase of the emulsion and comprises the components designed to function as an adhesive; the emulsion concentrate (II) constitutes the basic emulsion containing the emulsion base (I) as the non-aqueous phase and a minimum amount of water; the emulsion (III) is the product applied to the soil after further dilution with water.

In general, the bonding agent of my invention which forms the non-aqueous phase of the invention is a multi-component system composed of:

1. An unvulcanized elastomer, which has the desirable properties hereinafter specified as minimal strength of 1000 p.s.i. tensile and 700% elongation at break, and a 300% modulus of at least 100 p.s.i.
2. Petroleum oils substantially free of fractions boiling below 300° F. at 760 mm. of mercury pressure, i.e., about 160° C. at 10 mm. of mercury pressure ASTM Test Method D-1160.

The petroleum oil fraction may be a lube oil, spray oil, or a solvent extract from the refining of petroleum. For some purposes, I prefer to employ an asphalt fraction known to those skilled in the art as maltenes as the petroleum oil fraction or a portion of the petroleum fraction. I may also use the maltenes contained in an asphalt.

The petroleum oil portion and the asphalt may be suitably modified to meet various requirements in the various services for which they are designed and may be applied in combination with or in the absence of a polar solvent and either directly or in emulsion form. Where the asphalt is used together with the oil fraction, it should suitably have the same solvent system and emulsifier as does the oil fraction.

3. Nitrogen bases (as determined by ASTM Method D-2006).

4. A stiffening resin. For some purposes it is desirable to incorporate a stiffening resin into the bonding agent. This is most practically done by incorporating such a resin into the oil fraction. The resin should be compatible with the elastomer and the oil and the asphalt, if the asphalt is used. Such resins and their function to impart a degree of rigidity to the elastomer will be well understood by those skilled in the plastic art or as will also be further described herein.

5. Organic solvents. For some uses suitable organic solvents may be employed in combination with the oil phase to modify the properties of the oil phase of the emulsion. These solvents may be polar or nonpoplar solvents or combinations thereof.

The ingredients employed in formulating the bonding agent of my invention should have the additional properties that they be compatible with each other without syneresis. In formulating the emulsion of my invention, it is desirable that all of the ingredients used in producing the oil phase of such emulsion be first mixed to produce a uniform dispersion prior to mixing with water to form the emulsion.

At least one, and preferably two, emulsions are used in consolidating soils according to my invention. The primary emulsion which is preferred for soil treatment is designated Emulsion A, which is essentially free of asphaltenes, and the secondary emulsion, which contains asphaltenes, may be used in conjunction with the primary emulsion, but may be used alone, is designated Emulsion B.

Wherever in the claims and specifications the terms "asphaltenes" and the symbol "A" and "nitrogen bases" or its symbol "N" and "first acidaffins" or its symbol "$A_1$" or "paraffins" or its symbol "P" or "second acidaffins" or its symbol "$A_1$" are employed, it is there intended to mean said fraction as identified and determined by ASTM test method D–2006.

THE ELASTOMER

The preferred elastomeric polymer is a thermoplastic elastomer of the block copolymer type, or a blend of such polymers, having the following physical and chemical properties:

(a) a substance that can be stretched at room temperature to at least twice its original length and, after having been stretched and the stress removed, returns with force to approximately its original length in a short time, *
(b) soluble in trichloroethylene,
(c) soluble in xylene,
(d) soluble in ASTM Extender oils Nos. 101 and 102,
(e) insoluble in n-pentane
(f) capable of forming films, as cast from solutions such as trichlorethylene, having a 300% modulus of at least 100 p.s.i., a tensile strength of at least 1000 p.s.i. and an elongation at break of at least 700%.

Block copolymers are symbolized by the symbols which refer to the composition blocks of the monomers which enter into the formation of the copolymer. Block copolymers employed in the examples, are the result of copolymerization of blocks of monomers which are produced in an initial step of homopolymerization. Examples of such types of copolymers generally included within the term "SBR" block copolymers are copolymers having configurations such as are described herein.

When the homopolymer poly(butadiene) has the configuration $(b)_n=B$, and poly(styrene) has the configuration $(s)_n=S$, block copolymers of these homopolymers have the configuration S—B or S—BOS or B—S—B or

S—B—S.

Thermoplastic block copolymers, illustrated by those employed in the following examples are of the S—B—S or

S—B—S type,

*See ASTM Special Technical Publication No. 184, "Glossary of Terms Relating to Rubber and Rubber-Like Materials," p. 28 (1956).

in which the end blocks are the relatively rigid blocks S and the inner block is the elastic chain-like block B. Such polymers are herein referred to as poly(styrene) ended block copolymers.

An informative paper on the influence of structure and composition on properties of block copolymers has been published by Childers and Kraus in "Rubber Chemistry and Technology" 40, (4) 1183–1199 (September 1967). Since no claim is made to the polymers per se, and since they have been described in the prior art, it will be sufficient to refer to the above-cited literature and also to U.S. Pats. 2,975,160; 3,113,912; 3,251,905; 3,231,635; 3,239,478; 3,242,038; 3,265,765; 3,299,174; and 3,333,024, which pertain to block copolymers.

Poly(styrene)-poly(butadiene)-poly(styrene) block copolymers, which may be employed in formulating the emulsion base and the emulsions of my invention, may be similar to the copolymers which have been described in the above-cited patents as having the following characteristics, to wit, conjugated diene blocks of molecular weight between 2,000 and 1,000,000 and the end blocks having molecular weight between 2,000 and 100,000.

Other block copolymers such as poly(styrene)-poly(acrylonitrile) - poly(styrene); poly(styrene) - poly(isoprene)-poly(styrene), or other combinations of plastic and elastic polymer blocks may also be used. All of the foregoing poly - (styrene)-poly(diene)-poly(styrene) copolymers are polystyrene ended. The end blocks are poly(styrene) blocks and are distinguished from the poly(styrene)-poly(diene) two-block copolymers in which one end block is a poly(diene) block or other styrene-diene rubbers in which the arrangement of the styrene and diene monomer units are in random orientation. Those skilled in the art will also be able to substitute, for block copolymers, graft polymers as long as this fulfills the requirements of the characteristics for which the block copolymers are chosen in accord with the present invention, i.e., capable of developing material strength without the step of vulcanization.

The elastomers which are most suitable for use in the composition of my invention may be characterized as having in their unvulcanized state the following properties: a solution of 15% by weight of the polymer in trichlorethylene should have a viscosity of at least 300 centipoises and may be higher depending on the molecular weight of the polymer. A film cast from trichlorethylene should preferably have a tensile strength of above about 1,000 and more preferably above about 2,000 p.s.i. as a minimum and have an elongation at break of at least about 700% by ASTM Method D–412. I may use poly(styrene) ended copolymers to be all of the same type, or use blends or compatible mixtures of such styrene ended copolymers in any proportion which have the aforementioned properties or blends of poly(styrene) ended block copolymers of high strength with extender oils which after blending with extender oils have at least the above stipulated minimal properties.

I prefer, however, in formulating the compositions and emulsions of my invention to employ the S—B—S or

and other poly(styrene)-poly(diene)-poly(styrene) block copolymers having the aforesaid properties.

Examples of the aforesaid poly(styrene)-poly(butadiene)-poly(styrene) block copolymers are given in Tables 1, 2, 3 and elsewhere in this specification. The block copolymers of Table 1 have butadiene: styrene ratios of 50/50 to 65/35.

TABLE 1

| Polymer designation* | B/S[1] | Percent S[2] | I.V.[3] | MS-4[4] | Brookfield viscosity[5] | T[6] | Elongation[6] |
|---|---|---|---|---|---|---|---|
| CD 821 | 65/35 | 35 | 1.29 | 104 at 240° F | 3,600 | 4,000 | 810 |
| CD 822 | 60/40 | 38 | 1.45 | 70 at 270° F | 7,800 | 3,350 | 990 |
| CD 823 | 65/35 | 35 | 1.07 | 101 at 240° F | 1,700 | 3,500 | 875 |
| CD 824 | 60/40 | 25 | 1.37 | 94 at 212° F | 12,000 | 2,750 | 975 |
| CD 825 | 50/50 | 45 | 0.92 | 46 at 275° F | 850 | 3,400 | 800 |
| CD 957 | 65/35 | 35 | 1.29 | 104 at 240° F | 2,450 | 4,080 | 740 |
| CD 960 | | 28.8 | 1.89 | | 760 | 2,620 | 1,000 |
| Solprene 406-01 | | | | | 3,700 | 4,250 | 800 |
| Solprene 406-02 | | | | | 2,300 | 4,170 | 775 |
| CD 1252 | | | | 42 at 270° F | 460 | 4,300 | 775 |
| Solprene 406-04 | 60/40 | | | 38.5 at 270° F | 535 | 4,170 | 840 |
| Solprene 406-05 | 60/40 | | | 66 at 270° F | 7,675 | 4,800 | 830 |
| Solprene 406-06 | 60/40 | | | 28 at 270° F | 600 | 3,970 | 840 |
| Solprene 406-08 | 60/40 | | | | 370 | 3,850 | 80 |

[1] Butadiene-styrene ratio.
[2] Percent styrene as block
[3] Inherent viscosity (for definition, see *Journal of Colloid Science I* (3) 261-9, May, 1946; reprinted in *Rubber Chemistry Tech.* XIX (4) 1092-6, October, 1964).
[4] Mooney Viscosity, A.S.T.M. Method D-1646.
[5] Brookfield viscosity of a 15% solution in trichlorethylene, cp at 77° F., using No. 4 spindle.
[6] A.S.T.M. Method D-412.
*Polymers sold by Phillips Petroleum Company.

Other suitable block copolymers with butadiene:styrene ratio of about 75:25, are the products produced by Shell Chemical Company and are identified in Table 2.

TABLE 2

| | Tensile strength, p.s.i.* | Elongation at break, percent* |
|---|---|---|
| Kraton 101 | 4,600 | 880 |
| Kraton 102 | 4,100 | 950 |

*A.S.T.M. D-412.

THE STIFFENING RESIN

The thermoplastic resin when used is employed to stiffen the elastomer. A suitable stiffening resin may be a styrene polymer or coumarone-indene resin. The polymer or resin should have properties which are similar to those of the coumarone-indene type. Resins derived from coal tar or petroleum can be used.

The preferred softening point range of the amorphous resin is from about 140° F. to 300° F. The main characteristics of the resin are that it is amorphous and does not possess the elastomeric properties of being extensible and retractable and is compatible with the elastomer. Although not bound by any theory, I believe the resin or resins apparently modify the performance of the elastomer by their stiffening effect at ordinary temperatures and their low viscosity at elevated temperatures. Typical examples of commercial resins having suitable properties are, in addition to poly(styrene), the Neville Chemical Co. resins "Nevchem," "Nebony," "Anares," "R-16" and "R-16A," and the Pennsylvania Industrial Chemical Corp. resins, "Picco," "Piccopale," "Piccolyte," "Piccodiene," "Piccotex" and "Resinex."

The resins are identified by the suppliers as shown in Table 3.

TABLE 3

Nevchem: aromatic hydrocarbon resin
Nebony: aromatic hydrocarbon resin
Anares: hydrocarbon resin
R-16: coumarone-indene resin
R-16A: coumarone-indene resin
Picco: aromatic polyindene and coumarone-indene resin
Piccopale: hydrocarbon resins
Piccolyte: alpha and beta terpene polymers
Piccodiene: aromatic resin
Piccotex: vinyl toluene-α-methylstyrene copolymer
Resinex: aromatic resins The particular amorphous resin which is employed is not critical except that it must be compatible, i.e., miscible, but essentially nonreactive, with the thermoplastic polymer and with the oil, asphalt and solvents used.

THE PETROLEUM FRACTION (a) The Petroleum Fraction may be a petroleum oil fraction The oil fraction is preferably substantially free of material boiling below 300° F. at 760 mm. of mercury pressure, i.e., about 160° C. at 10 mm. mercury pressure (ASTM Method D-1160).

The oil chosen should be compatible with the poly(styrene) ended block copolymers and the asphaltenes and mixtures of like copolymer and asphaltenes in the asphalt containing the block copolymer. Such an oil is here termed a compatible oil as will be more fully described below. The paraffins content of the oil is chosen with this end in view and the permissible content of the paraffins in the oil depends on the composition of the block copolymer and the ratio of the copolymer asphaltenes and oil.

The oil may be a rubber extender oil or a blend of high boiling oils which are compatible with the polymer such as maltenes which is the pentane soluble fraction of asphalts. The preferred oils are generally of the type defined as ASTM extender oils 101 and 102 in ASTM Designation D2226-63T. These oils are substantially free of asphaltenes. Examples of suitable extenders are Witco Chemical Company products Califlux GP and Califlux 550, Phillips Petroleum Company product Philrich 5, and Shell Oil Company products Dutrex 739 and Dutrex 1786; further identified in Table 4.

TABLE 4

| | Rubber extender oil, ASTM type | Viscosity at 25° C., cp. |
|---|---|---|
| Califlux GP | 101 | 12,000 |
| Califlux 550 | 101 | 750,000 |
| Philrich 5 | 101 | 30,000 |
| Dutrex 739 | 101 | 22,000 |
| Dutrex 1786 | 101 | 28,000 |

The petroleum oils specified in Table 5 are suitable and contain suitable contents of nitrogen bases.

Typical compositions of maltenes are shown in Table 5a, which shows the results of fractional analysis performed on blends produced from three penetration grades of asphalts as reported by Halstead, Rostler and White in the "Proceedings of the Association of Asphalt Paving Technologists," Vol. 35, p. 106 (1966).

TABLE 5

|  | 1 | 2 | 3 | 4 | 5 | 6 | 7 | 8 |
|---|---|---|---|---|---|---|---|---|
| Initial boiling point* (° C.) | 375 | 360 | 432 | 432 | 480 | | | |
| Specific Gravity, 60°/60° F | 1.015 | 0.997 | 1.028 | 0.966 | 0.957 | 1.02 | 1.02 | 1.03 | 1.0 |
| Asphaltenes | 0 | 0 | 0 | 0 | 0 | 0 | 0 | 0 | 0 |
| Nitrogen base (N) | | | | | | 18.7 | 23.1 | 27.1 | 12.4 |
| First acidaffins ($A_1$) | | | | | | 15.5 | 21 | 18.9 | 13.6 |
| Paraffins (P) | 11.4 | 11.9 | 7.6 | 35.7 | 40.7 | 10.8 | 8.7 | 6.9 | 10.7 |
| Second acidaffins ($A_2$) | 52.9 | 61.4 | 40.7 | 35.4 | 37.2 | 55 | 47.2 | 47.1 | 63 |

*At 760 mm. mercury, i.e., about 140° above boiling point at 10 mm. (Hg) ASTM Method D-1160.

TABLE 5a

| Maltenes from— | Composition of maltenes, percent | | | |
|---|---|---|---|---|
|  | N | $A_1$ | $A_2$ | P |
| 60–70 pen. Asphalt I | 19.1 | 28.1 | 34.7 | 18.1 |
| 60–70 pen. Asphalt II | 22.4 | 30.1 | 31.9 | 15.6 |
| 60–70 pen. Asphalt III | 29.4 | 27.0 | 29.7 | 13.9 |
| 60–70 pen. Asphalt IV | 31.1 | 29.3 | 27.4 | 12.2 |
| 60–70 pen. Asphalt V | 34.3 | 32.6 | 23.8 | 9.3 |
| 85–100 pen. Asphalt I | 19.9 | 26.5 | 35.5 | 18.1 |
| 85–100 pen. Asphalt II | 27.8 | 26.4 | 31.1 | 14.7 |
| 85–100 pen. Asphalt III | 31.4 | 26.9 | 29.6 | 12.1 |
| 85–100 pen. Asphalt IV | 33.9 | 28.3 | 26.8 | 11.0 |
| 85–100 pen. Asphalt V | 41.7 | 23.4 | 21.5 | 13.4 |
| 120–150 pen. Asphalt I | 20.4 | 26.4 | 34.0 | 19.2 |
| 120–150 pen. Asphalt II | 24.8 | 26.8 | 31.8 | 16.6 |
| 120–150 pen. Asphalt III | 30.2 | 26.9 | 28.4 | 14.5 |
| 120–150 pen. Asphalt IV | 37.7 | 23.1 | 25.7 | 13.5 |
| 120–150 pen. Asphalt V | 37.8 | 28.4 | 21.7 | 12.1 |

(b) The Petroleum Fraction may be an asphalt

An asphalt of low penetration grade may be used, i.e., less than 30, for example 1 to 30 penetration, capable of being fluxed with the petroleum oil referred to above to a penetration of 60 to 120 when producing the emulsion base for the secondary emulsion designated as Emulsion B. I may use an asphalt of higher penetration and reduce the concentration of fluxing oil to bring it into the range of 60 to 120 penetration. Suitable asphalts are conventional petroleum asphalt or an air-blown asphalt. If a softer asphalt, i.e., one of a higher penetration grade, is used it should be considered a low penetration grade asphalt diluted with a plasticizer. Harder asphalts may be used with additional plasticizer ingredient, in amounts to bring the penetration (consistency) of the resulting blend into the desired range of about 40 to 120 and preferably penetration of about 60 to about 120. Penetration of asphalt is determined by ASTM Method D5.

THE NITROGEN BASES

The presence of the ingredient is important to assure mutual solubility of all components, particularly of the emulsions containing the n-pentane-insoluble asphaltenes and the n-pentane-insoluble block copolymers.

They may be employed either as a separate component added to the petroleum oil which is deficient in these compounds or may form a portion of the petroleum oil or asphalt fractions as produced.

I may employ an oil of relatively low nitrogen bases content and supplementing it by the addition of a fraction of high nitrogen bases content such as the nitrogen bases derived from gilsonite described below. I may use a petroleum oil or petroleum oil solvent extract having suitable nitrogen bases content. Examples of oils containing a desirable content of nitrogen bases are given in the above Table 5.

Examples of asphalts having nitrogen bases content within the desirable range are given by Rostler et al., "Composition and Changes in Composition of Highway Asphalt 85–100 Grade," Proceedings Association of Asphalt Paving Technologists, Vol. 31, January 1962, pp. 35–89. Asphalts of 40 to 70 penetration grade also have nitrogen bases contents in said range.

The desirable nitrogen bases content of the emulsion base should be from about 5 to about 50% by weight of the petroleum fraction including said nitrogen bases.

The nitrogen bases in the emulsion base act as non-volatile polar solvents. Where asphalt is used they assure mutual compatability and thus the synergistic effect of the asphaltenes contained in the asphalt and the added block copolymer. Additionally, the non-volatile polar solvent plasticizes the thermo-plastic polymer and the hard resin to provide for low viscosity of the system during the emulsification process, contributes to the adhesiveness of the blend, and assists in the penetration of the emulsion into fine-grained soils.

THE VOLATILE POLAR SOLVENT

The volatile polar solvent when used in the emulsion base must be a good solvent for the various components of the blend. Its main functions are apparently to improve penetration of the emulsion into the treated soil, to assist in the formation of thin films on the soil particles and aggregate, and to reduce fire hazard. Suitable solvents of this type are low boiling, e.g., below about 125° C., chlorinated hydrocarbons, such as trichlorethylene. The amounts employed are generally sufficient to raise the flash point of the emulsion concentrate to a safe value, i.e., above about 80° F., while not increasing the specific gravity of the emulsion base above about 0.9 to 1.1.

THE VOLATILE AROMATIC SOLVENT

A volatile aromatic hydrocarbon type solvent is used. The solvent should be miscible with the volatile polar solvent and all components of the emulsion base and be capable of reducing the viscosity of the emulsion base and of adjusting the specific gravity of the emulsion base desirably to approximate that of water prior to the emulsification step. Typical aromatic solvents are benzene, toluene and xylene. Napthas containing these chemicals can also be used. One skilled in the art may select various suitable aromatic solvents or azeotropes from those listed in the literature, e.g., "Solvents Guide," by Marsden and Mann (Cleaver-Hume Press Ltd., London).

The combination of the volatile solvents used in the emulsion bases of my invention serve primarily to improve penetration of the emulsions into the treated soil, to assist in the formation of thin films on the soil particles and aggregate, and to reduce the fire hazard.

In using mixtures of xylene and trichlorethylene, a weight ratio of 10 parts of trichlorethylene to 40 parts of xylene and 50 parts of petroleum hydrocarbon oil, ASTM type 101 will provide a flash point of 100° F. while higher trichlorethylene:xylene ratios of 1:1, 2:1 or higher may be employed. In each case a total of 50 parts of trichlorethylene and xylene with 50 parts of rubber extender oil, ASTM type 101 provides a flash point above 100° F. Consistent with keeping the flash point at a safe level, i.e., above about 80° F. according to ICC regulations, I may use weight ratios of volatile aromatic hydrocarbon type solvent to polar volatile solvent up to about 5:1 and preferably up to about 4:1 while maintaining the specific gravity of the emulsion base between about 0.9 to 1.1.

THE SURFACTANT EMPLOYED IN PREPARING THE EMULSIONS

A great number of cationic surfactants suitable as emulsifiers are available which are suitable for use in formulating the emulsion. The cationic surfactant should be a good emulsifying agent and provide a lasting positive charge. Small amounts of a nonionic surfactant can also be added to facilitate emulsification and to minimize foaming.

Emulsifiers may be of the class of fatty quaternary ammonium salts, fatty amido-amino-amine salts, e.g., amido-amino-amine acetate, etc., alkyl amino alkylene amines and their salts and include the use of cationic surfactants with nonionic surfactants such as poly(ethoxy compounds. Various suitable surfactants are described in standard textbooks such as "Encyclopedia of Surface Active Agents" by Sisley and Wood (Chemical Publishing Company, Inc., New York), and "Surface Active Agents and Detergents" by Schwartz, Perry & Birch (Interscience Publishers, New York).

THE COMPOSITION OF THE EMULSION BASE

The preferred elastomeric bonding agent, modified as desired by the addition of a stiffening resin, may be applied dissolved in a volatile solvent or applied in the form of an emulsion.

The preferred poly(styrene) ended block copolymers may be used in the ratio of about 0.01 to 1 part by weight of the copolymers to one part by weight of the sum of said petroleum fraction and the nitrogen bases.

Where the oil, as described above is used as an extender oil for a block copolymer of high strength, the ratio of the copolymers to the oil is suitably in the range of about .1 to about 10 parts by weight of the polymer to one part by weight of the sum of the oil, and nitrogen bases. Table 6 lists properties of such blends of oil and polymer.

Where the petroleum oil is an asphalt, the ratio of the copolymer to the asphalt, including any fluxing agent, and nitrogen bases is preferably in the range of .01 to .15 parts by weight of the copolymer to about one part by weight of the sum of the asphalt and fluxing agent, and the nitrogen bases. The combined asphalt and fluxing agent including the nitrogen bases and copolymers preferably should have a penetration at 77° F. in the range from about 40 to about 120 and preferably in the range of about 60 to about 120.

Where the emulsion is used for bonding aggregates whose permeability is low, as is more fully described below, I may and preferably do employ the volatile solvent system described above.

Antioxidants and antiozonants, such as commonly used to inhibit the attack of oxygen and ozone on rubber compounds, may be added to the composition to improve the aging properties of the binder.

THE COMPOSITION OF THE EMULSION BASE INCLUDING THE PETROLEUM EXTENDER OIL (EMULSION A)

In forming the primary emulsion herein designated as Emulsion A, the polymer, together with the amorphous resin and the oil containing the nitrogen bases are dispersed in the volatile polar solvent and the volatile aromatic hydrocarbon solvent when such solvent is employed, to form what is termed "the emulsion base". The specific gravity of the polymer-resin-solvent system (emulsion base) should be close to that of water, for example, about 0.9 to 1.1. After achieving the proper specific gravity for the emulsion base, the system is then emulsified in water with a cationic emulsifier. The emulsion may be acidified to a pH of about 4.5 to 6.5. Acetic acid and hydrochloric acid are preferred acids for use in the acidification.

The emulsifier concentration should be kept relatively low so as to prevent spontaneous re-emulsification when the composition, after application to the soil and evaporation of the water phase, is rewet as, for example, by rainfall. Preferably, the concentration of emulsifier is about 3% by weight or less of the total emulsion concentrate.

The particle size has been found to be an important property of the emulsion in order to obtain good penetration into the soil, particularly in the case of fine-grained soils. A suitably small particle size is also quite important in producing a tack-free surface of the treated area reasonably soon after application. By observing emulsions of the same composition but having different particle sizes of the dispersed phase under a microscope, I have found that emulsions which do not penetrate satisfactorily into fine-grained soils, such as silt, have a preponderant amount of particles in the dispersed phase above 15 microns. Emulsions with particle sizes in the dispersed phase which are predominantly less than 10 microns were found to penetrate readily and to give a nontacky surface of the treated soil within four hours after application. The dispersed phase of my preferred emulsion has a particle size distribution of over 90% in the range of 0.5 to 5 microns and less than 5% above 10 microns.

I prefer to produce the emulsion with a minimum amount of water and volatile solvent and to dilute the concentrated emulsion with water before use. The ratio of the elastomer-oil-resin-solvent phase to the water phase in emulsion concentrates may range from about 4:1 to about 1:3. For ease of dilution, I prefer an emulsion concentrate with about 50% of "solid," i.e., elastomer, resin and nonvolatile solvent, (excluding the volatile solvents and water). Higher concentration of the non-aqueous phase is desirable for economy of shipping, packaging, and storage. Suitable compositions, in accord with my present knowledge, can encompass a variety of ratios, e.g.: 1 part elastomer:1 part stiffening resin:3 parts extender oil; 1 part elastomer:2 parts stiffening resin:3 parts extender oil; 1 part elastomer:3 parts stiffening resin:2 parts extender oil. The ratios employed are such as to form solutions having viscosities which facilitate producing fine particle size emulsions, i.e., with a particle size of the dispersed phase of predominantly less than 10 microns and preferably less than 3 microns. Conventional emulsification equipment may thus be used.

Selection of the ratios of elastomer to resin to oil is influenced by the strength and the viscosity of the polymer, and while I may use any thermoplastic poly(styrene) ended block copolymer which meets the requirements set forth above, a polymer which has much higher tensile strength than the minimum specified may be used in a reduced proportion, with the proportion of the extender oil correspondingly increased. Table 6 lists properties of blends of the poly(styrene) ended block copolymers with extender oils, and may be used for determining which of the polymers are suitable for use in reduced proportion, i.e. which polymer-oil blends can be substituted for the polymer meeting the minimum requirements of 1000 p.s.i. tensile strength, 700% elongation at break and 100 p.s.i. modulus at 300% elongation, and desired viscosity for ease of emulsification.

TABLE 6

[Properties of thermoplastic polymers]

| | Composition | | Brookfield viscosity,* (cp.) 15% wt. in trichlorethylene | Physical properties of cast film from indicated composition** | | |
|---|---|---|---|---|---|---|
| Sample No. | Wt. percent polymer | Wt. percent oil | | Tensile at break, p.s.i. | 300% modulus, p.s.i. | Elongation at break, percent |
| 1 | 80 Kraton 102 [1] | 20 GN [2] | | 475 | 150 | 900 |
| 2 | 90 Kraton 102 | 10 GP [3] | 665 | | | |
| 3 | 80 Kraton 102 [1] | 20 GP | 460 | 2,450 | 200 | 1,090 |
| 4 | 90 Kraton 102 | 10 Cal 550 [5] | 890 | | | |
| 5 | 80 Kraton 102 | 20 Cal 550 | 600 | 2,965 | 205 | 1,015 |
| 6 | 90 CD 821 [4] | 10 GN [2] | 2,500 | 2,235 | 330 | 915 |

See footnotes at end of table.

TABLE—Continued

[Properties of thermoplastic polymers]

| Sample No. | Composition Wt. percent polymer | Wt. percent oil | Brookfield viscosity,* (cp.) 15% Wt. in trichlorethylene | Physical properties of cast film from indicated composition** | | |
|---|---|---|---|---|---|---|
| | | | | Tensile at break, p.s.i. | 300% modulus, p.s.i. | Elongation at break, percent |
| 7 | 80 CD 821 [4] | 20 GN [2] | 1,450 | 1,315 | 290 | 885 |
| 8 | 90 CD 821 [4] | 10 GP [3] | 2,300 | 2,495 | 320 | 885 |
| 9 | 80 CD 821 [4] | 20 GP [3] | 1,225 | 2,530 | 250 | 990 |
| 10 | 67 CD 821 [4] | 33 GP [3] | 553 | 1,400 | 125 | 1,300 |
| 11 | 73 CD 821 [4] | 27 GP [3] | 920 | 2,450 | 200 | 985 |
| 12 | 90 CD 822 [4] | 10 GN [2] | 3,245 | 2,575 | 385 | 1,040 |
| 13 | 80 CD 822 [4] | 20 GN [2] | 1,870 | 1,375 | 270 | 985 |
| 14 | 90 CD 822 [4] | 10 GP [3] | 3,385 | 3,180 | 450 | 1,025 |
| 15 | 80 CD 822 [4] | 20 GP [3] | 1,880 | 2,720 | 385 | 1,075 |
| 16 | 67 CD 822 [4] | 33 GP [3] | 890 | 2,005 | 235 | 1,225 |
| 17 | 60 CD 822 [4] | 40 GP [3] | 555 | 1,425 | 100 | 1,000 |
| 18 | 90 Kraton 101 [1] | 10 GN [2] | 1,705 | 2,835 | 345 | 1,200 |
| 19 | 80 Kraton 101 [1] | 20 GN [2] | 930 | 925 | 245 | 915 |
| 20 | 90 Kraton 101 [1] | 10 GP [3] | 1,630 | 3,930 | 365 | 1,085 |
| 21 | 80 Kraton 101 [1] | 20 GP [3] | 930 | 2,650 | 275 | 1,200 |
| 22 | 75 Kraton 101 [1] | 25 GP [3] | 638 | 3,250 | 190 | 1,050 |

[1] Styrene ended block copolymer sold by Shell Chemical Co.
[2] Nitrogen bases concentrate GN-104 produced by American Gilsonite Co. (See below).
[3] Rubber extender oil, ASTM Type 101, viscosity 12,000 cps. at 25° C.
[4] Styrene ended block copolymer produced by Phillips Petroleum Co.
[5] Rubber extender oil, ASTM Type 101, viscosity 750,000 cps. at 25° C.
*#4 spindle, 73° F.
**Films cast from 15% by wt. trichlorethylene solutions.

As shown from the table and figure, the various of the polymer-oil blends which may be considered suitable for purposes of my invention include the following:

90% Kraton 102-10% Califlux GP
80% Kraton 102–20% Califlux 550
75% Kraton 101–25% Califlux GP
67% CD–821–33% Califlux GP
60% CD–822–40% Califlux GP The above polymer-oil blends are only examples of particular polymer-oil combinations which meet the criteria set forth above for use in my invention. Other polymers and oils of different viscosities will require different ratios of polymer to oil. As the molecular weight of the polymer is increased, the ratio of polymer to oil may be decreased and the amount and viscosity of the oil employed can be increased. In any event, the ratio of polymer to oil for any particular polymer and oil may be readily determined according to the parameters which I have set forth above.

The viscosity of the emulsion which is required to produce the necessary particle size of the dispersed phase will be determined to some extent by the type and efficiency of the emulsification equipment, e.g., colloid mills, high speed emulsifiers, ultrasonics emulsifiers, homogenizers, etc. It was found in using a pipeline mixer, such as the Eppenbach Homo-Mixer, produced by Gifford-Wood, Inc., Hudson, N.Y., that the viscosity of the emulsion base should be about 20,000 to 30,000 centipoises as measured at room temperature, i.e., about 25° C.

To form a suitable emulsion, the emulsion base, i.e., the polymer, oil, resin and solvents comprising the dispersed phase, should constitute about 30 to about 85 parts by weight, and the water phase about 70 to about 15 parts by weight. In formulating the preferred Emulsion A, an oil blend of a thermoplastic elastomer is prepared. The elastomer or elastomer-extender oil blend are preferably of the type described above, which, as cast from trichlorethylene solution give films having tensile strength of at least 1,000 p.s.i., and elongation at break of approximately 700% or more as determined by ASTM Method D-412. The oil in the polymer-oil blend is either a rubber extender oil or a blend of high boiling oils which are compatible with the polymer. Suitable emulsions have been prepared with amounts of the polymer-oil blend ranging from 4.0 to 25.0% of the total concentrate while the other ingredients were adjusted accordingly using the criteria set forth above. The oils are generally of the type defined as ASTM extender oils 101 and 102 in ASTM Designation D2226-63T. The oils preferably contain about 5 to about 50% by weight of nitrogen bases as determined by ASTM procedure D–2006. The content of paraffins must be sufficiently low as not to precipitate the n-pentane-insoluble polymer or the n-pentane-insoluble asphaltenes, such oils are herein referred to as compatible oils. A thermoplastic amorphous resin compatible with the polymer-oil blend described above is used. A polar solvent, preferably one containing nitrogen bases, which is non-volatile under atmospheric conditions and immiscible with water may be used, if the aforesaid oil does not contain sufficient nitrogen bases to impart to the oil, the nitrogen bases content stated above. A polar solvent which is volatile under atmospheric conditions and immiscible with water may also be used.

I may also employ for some uses a non-polar solvent of the aromatic hydrocarbon type which is volatile under atmospheric conditions. This base may form the oil base of a cationic emulsion.

The following is a specific formulation which is the presently preferred embodiment of the primary Emulsion A:

Composition #1: Percent by weight
Elastomer [1] _____ 8.0
Stiffening resin, softening point 100–100° C. __ 17.0
Oil [2] _____ 22.0
Trichloroethylene _____ 15.0
Xylene _____ 10.0
Cationic Surfactant [3] _____ 2.0
Acetic acid (glacial) [3] _____ 1.0
Water _____ 25.0

[1] Characterized by a viscosity of 600–1200 centipoises of a 15% solution in trichlorethylene.
[2] A blend of 22.5% of nitrogen bases from gilsonite (see GN supra) having the following typical properties:
  Initial boiling point at 760 mm. Hg (° F.) _____ 226
  Chemical composition (ASTM Method D2006) (percent):
    A _____ 2.3
    N _____ 91.1
    A₁ _____ 4.2
    A₂+P _____ 2.4
  with 77.5% of rubber extender oil, ASTM Type 101.
[3] Tallow diamine acetate.

Composition #2: Percent by weight
Oil phase:
  Solprene 406–08 _____ 9.0
  Califlux GP _____ 51.0
                                                   ─────
                                                   60.0
Water phase:
  Cationic surfactant _____ 3.0
  HCl (31.5%) _____ 0.3
  Water _____ 36.7
                                                   ─────
                                                   40.0

Composition #3:  Percent by weight
Oil phase:
    Solprene 406-02 ---------------------- 9.0
    Anares resin ------------------------- 9.0
    Califlux GP -------------------------- 27.0
    Trichlorethylene --------------------- 15.0
    Xylene ------------------------------- 10.0
                                                  70.0

Water phase:
    Cationic surfactant ------------------ 3.0
    HCl (31.5%) ------------------------- 1.25
    Water -------------------------------- 25.75
                                                  30.0

Composition #4:  Percent by weight
Oil phase:
    Solprene 406-05 ---------------------- 9.0
    Anares resin ------------------------- 9.0
    Califlux GP -------------------------- 27.0
    Trichlorethylene --------------------- 15.0
    Xylene ------------------------------- 10.0
                                                  70.0

Water phase:
    Cationic surfactant ------------------ 3.0
    HCl (31.5%) ------------------------- 1.25
    Water -------------------------------- 25.75
                                                  30.0

Composition #5:  Percent by weight
Oil phase:
    Solprene 406-04 ---------------------- 12.0
    Califlux GP -------------------------- 43.2
    Naphtha ------------------------------ 4.8
                                                  60.0

Water phase:
    Cationic surfactant ------------------ 3.0
    HCl (31.5%) ------------------------- 1.25
    Water -------------------------------- 35.75
                                                  40.0

Composition #6:  Percent by weight
Oil phase:
    Solprene 406-05 ---------------------- 8.3
    Anares resin ------------------------- 17.7
    Califlux GP* ------------------------- 17.7
    GN-104* ------------------------------ 5.3
    Trichlorethylene --------------------- 15.6
    Xylene ------------------------------- 10.4
                                                  75.0

Water phase:
    Cationic surfactant ------------------ 2.0
    Acetic acid (glacial) ---------------- 1.0
    Water -------------------------------- 22.0
                                                  25.0

*In place of Califlux GP and GN-104, I may use 23% of an $SO_3$ extract from the refining of lubricating oil, which contains suitable concentrations of nitrogen bases.

Composition #7:  Percent by weight
Oil phase:
    Solprene 406-08 ---------------------- 10.6
    Anares resin ------------------------- 15.9
    Califlux GP* ------------------------- 11.9
    GN-104* ------------------------------ 4.0
    Trichlorethylene --------------------- 20.8
    Xylene ------------------------------- 6.7
                                                  69.9

Water phase:
    Cationic emulsifier ------------------ 1.7
    HCl (31.5%) ------------------------- 1.1
    Water -------------------------------- 27.3
                                                  30.1

*In place of Califlux GP and GN-104, I may use 15.9% of the above mentioned $SO_2$ extract.

THE COMPOSITION OF THE EMULSION BASE INCLUDING ASPHALT (EMULSION B)

In forming the asphalt emulsion, herein designated Emulsion B, I may use asphalts of the 10-30 penetration grade. It is within the scope of my invention to replace the hard asphalt, for example, the aforesaid 10-30 penetration asphalt by one of higher penetration (e.g., 60 penetration) and to reduce the content of the refluxing agent accordingly. The aforesaid 10-30 penetration asphalt may also be replaced by a harder asphalt in reduced amount, with a higher content of fluxing agent, for example, an asphalt of 1 penetration.

Desirably, the nitrogen bases in the asphalt phase of the emulsion should be in the range of about 5 to 50%. As with the emulsion base for Emulsion A, the paraffins content should be low enough not to cause precipitation of the asphaltenes, which are insoluble in saturated hydrocarbons. I may use oils whose content of nitrogen bases is relatively low to reduce the penetration of the hard asphalts which contain sufficient amounts of these compounds.

The ingredients employed in the base which is used in formulating the preferred Emulsion B are:

An asphalt of the range of about 10-120 penetration grade, e.g., preferably containing a small amount, less than about 1%, of an anti-stripping agent: a fluxing agent, non-volatile under atmospheric conditions, which is immiscible with water; an aromatic hydrocarbon solvent; a polar solvent volatile at atmospheric conditions and immiscible with water and a cationic emulsification system.

Suitable asphalts are conventional petroleum asphalt or an air-blown asphalt. If a softer asphalt, i.e., one of a higher penetration grade, is used, it should be considered a low penetration grade asphalt diluted with plasticizer.

Penetration grade of asphalt is determined by ASTM Method D-5-65. The anti-stripping agent in the above formula can be any one of the conventional asphalt soluble cationic agents commonly used with asphalts in road paving construction, such as Redicote 2323. A cationic emulsifying agent which was found suitable is Redicote E-1 (a fatty amino-alkylene amino salt).

A suitable concentration range for the ingredients in Emulsion B is:  Weight percent
    Asphalt, 10-30 penetration grade ---------------- About 40 to about 60.
    Asphalt fluxing agent ----- Up to about 10.
    Solvent (Aromatic solvent plus Chlorinated Hydrocarbon) ---------------- About 15 to about 40.
    Cationic surfactants ------ About 0.2 to about 3.
    Water ------------------- Balance.

The asphalt with the fluxing agent, when used, combined with the polymer desirably should have a penetration according to the above test of from about 40 to about 120, and preferably about 60 to about 120. I may use from about 1 to about 15% of the polymer based on the asphalt including fluxing agent, if used.

The Emulsion Base B contains, in adidtion to the asphalt and the fluxing or plasticizing agent, an aromatic solvent and a chlorinated solvent such as trichlorethylene in proportions to give a non-aqueous phase having a specific gravity ranging between about 0.9 and 1.1. Suitable amounts of plasticizer ingredient may range from about 4 to about 25% by weight of the emulsion concentrate. The trichlorethylene is generally present in the concentrate in an amount sufficient to raise the flash point of the concentrate to a safe value, i.e. above about 80° F. while not increasing the specific gravity of the emulsion base above about 0.9 to 1.1. The weight ratio of volatile aromatic hydrocarbon type solvent to the trichlorethylene may range up to about 5:1 and preferably up to about 4:1 so as to provide a safe flash point while maintaining the specific gravity of the emulsion base between about 0.9 to 1.1.

In forming the concentrate of Emulsion B, the asphalt emulsion base, including an anti-stripping agent, all as defined above, is emulsified in suitable proportions with water and a cationic emulsifying agent to form an emulsion concentrate in which the particle size of the dispersed phase is predominantly less than about 10 microns, and preferably the particle size distribution of the dispersed phase is over 90% in the range of about 0.5 to about 5 microns and less than about 5% above 10 microns. The weight ratio of non-aqueous phase to water phase may range from about 4:1 to about 1:3. The emulsion concentrate may be acidified to a pH of about 4.5 to 6.5, acetic and hydrochloric acid being preferred for the acidification.

Specific examples of emulsions for the above purposes are as follows:

Composition #8:                Percent by weight
Asphalt phase:
   Asphalt, 15 penetration ---------------- 50.0
   Asphalt fluxing agent ------------------ 5.0
   Xylene -------------------------------- 8.50
   Trichlorethylene ---------------------- 8.0
                                             71.50

Water phase:
   Anti-stripping agent ------------------ 0.50
   Cationic surfactant ------------------- 2.0
   Acetic acid (glacial) ----------------- 1.0
   Water --------------------------------- 25.0
                                             28.50

Composition #9:                Percent by weight
Asphalt phase:
   Asphalt, 10–30 penetration ------------ 48.7
   Califlux GP --------------------------- 4.8
   Trichlorethylene ---------------------- 7.8
   Xylene -------------------------------- 8.3
   Anti-stripping agent ------------------ 0.4
                                            70.0

Water phase:
   Cationic surfactant ------------------- 3.0
   HCl (31.5%) -------------------------- 1.25
   Water --------------------------------- 25.75
                                            30.0

COMBINATIONS OF EMULSION A AND EMULSION B

When employing the asphalt Emulsion B in conjunction with the oil Emulsion A, I prefer to incorporate in Emulsion Base of Emulsion A and Emulsion B the same elastomer and solvent system.

Composition #10:              Percent by weight
Oil phase:
   Asphalt 1.5 penetration --------------- 30.2
   Extender Oil 101 ---------------------- 15.8
   Solprene 406–08 ---------------------- 4.0
   Xylene -------------------------------- 6.8
   Trichlorethylene ---------------------- 6.8
   Anti-stripping agent ------------------ 0.4
                                            64.0

Water phase:
   Cationic surfactant ------------------- 3.0
   HCl (31.5%) -------------------------- 1.25
   Water --------------------------------- 31.75
                                            36.0

The combination of an asphalt and an elastomer, i.e., poly(styrene) ended block copolymer in the systems of my invention results in an intermingling of the asphaltene molecules with the elastomer molecules. When the non-aqueous phases of Emulsion A and Emulsion B each contain oil fractions and elastomers which are mutually compatible, the phases will fuse and the elastomer will rapidly be distributed in the asphalt structure. The elastomer distributes itself statistically with the asphaltene molecules upon application of the emulsions to the soil. To assure that this is accomplished, I prefer to dissolve part of the elastomer in the oil portion used as fluxing agent in producing Emulsion B.

The asphalt employed in Emulsion B when employed in a mixture with Emulsion A should preferably be combined with the elastomer employed in the oil phase of Emulsion A. Desirably, the asphalt when combined with the elastomer should have penetration at 77° F. from about 40 to 120.

Preferably, also, the solvent system used in formulating the oil phase should also be used in formulating the asphalt phase.

The primary emulsion concentrate A and the secondary emulsion concentrate B may be mixed in various proportions. The concentration of ingredients in each emulsion may be such as to give a solids concentration (i.e., the soilds not including water and volatile solvents) in the order of about 30 to about 85% of the emulsion concentrate prior to dilution. The mixture of the two Emulsions A and B creates a polycomponent non-aqueous phase, one of said phases including the oil fraction which is substantially free of asphaltenes and the other including the asphalt, that is, the dispersed particles of the non-aqueous phases are discrete, one containing said oil fraction substantially free of asphaltenes and the other including the asphalt. When the emulsions break, the presence of the elastomer in all parts of the non-aqueous phase and particularly the presence of the common solvent in all portions of the non-aqueous phases permit the rapid blending and coalescence of the oil phases into a unitary and substantially uniform bonding agent containing all the components of both non-aqueous phases.

USES OF THE EMULSIONS

Emulsion A is effective in bonding soil in areas subject to wind forces and traffic and, therefore, is useful for soil stabilizing in areas bordering runways, taxiways and helicopter paths. It is also effective in stabilizing of slopes exposed to water run-off or which are subject to gully erosion. Emulsion B will deposit a bonding agent in soils to produce a tough bituminous cement of high durability which converts soils, particularly those containing coarse grain fractions into a surface having a high resistance to abrasion and good bearing strength.

Both emulsions can be diluted to any desired concentration with water before application. The two emulsions containing the same emulsifying system are mutually compatible in all proportions and dilutions. Emulsions A and B can be used individually, consecutively or in blends by applying them in sequence or in mixtures. When used together, the degree of flexibility imparted to the stabilized soil depends on the amount of Emulsion A employed, while the degree of rigidity depends on the amount of Emulsion B.

Table 7 shows the bearing strength achieved with Emulsion B and with two formulations of Emulsion A, and blends of the two emulsions applied to a synthetic soil consisting of 85% graded Ottawa sand, 10% ground silica and 5% Dixie clay. Soils treated with the two compositions of Emulsion A are flexible and elastic, while soils treated with Emulsion B are rigid and tough, but not as flexible; the flexibility of the soils treated with the blends is in proportion to the content of Emulsion A in the blends. The difference in bearing strength of the soils treated with Composition #4 and Composition #6 is due to the different ratios of polymer:resin:petroleum oil in the two compositions.

TABLE 7
[Load-bearing capacity of treated soil*]

| Days cured at 77° F | 4 | 5 | 6 | 7 | 8 | 10 | 11 | 12 | 13 |
|---|---|---|---|---|---|---|---|---|---|
| Soil treated with: | | | | | | | | | |
| Emulsion B, Composition #10 | 35 | 150 | 230 | 350 | | 570 | | 600 | 620 |
| Comp. #4:Comp. #10: | | | | | | | | | |
| 30:70 | 30 | 100 | 240 | 340 | | 500 | | 550 | |
| 70:30 | 30 | 120 | 300 | 300 | | 400 | | 440 | |
| Emulsion A, Composition #4 | 50 | 130 | 190 | | | | 350 | | 400 |
| Comp. #6:Comp. #10: | | | | | | | | | |
| 30:70 | 25 | 60 | 200 | 230 | | 250 | | 300 | 310 |
| 70:30 | 30 | 70 | 100 | 130 | | 130 | | | 130 |
| Emulsion A, Comp. #6 | 25 | 50 | 80 | 80 | | | 80 | 80 | 80 |

*Measured with Soiltest penetrometer CT-421.

Particularly suitable ratios of the bonding agents for stabilization of soils and earth structures are 70:30 and 30:70 mixtures of Emulsion A and Emulsion B.

One great utility of Emulsion B lies in the fact that it penetrates into soils while conventional asphalt emulsions, as used previous to my invention, filter out the asphalt phase on the surface of soils. Because of this ability to penetrate, percolate and diffuse into soils and asphalt-bonded soils, Emulsion B of my invention can be successfully used as a cementing agent between layers of asphalt structures containing aggregate and for anchoring of fabrics as used for reinforcement of canal banks, reservoir linings, etc.

In order to further illustrate my invention, there are set forth the following Examples in which all parts and percentages are by weight, unless otherwise indicated.

EXAMPLES

Example 1.—Manufacture of Emulsion A (a) A mixture of 66.3 lbs. water, 6.0 lbs. of a cationic emulsifying agent, Redicote E-1, and 3.0 lbs. acetic acid was heated to 170° F. to form Solution 1.

(b) A mixture of 25 lbs. of a styrene ended block copolymer (Phillips CR-957), 47 lbs. trichlorethylene, 53.3 lbs. of an amorphous resin, Anares #1, 31.3 lbs. xylene, and 69.3 lbs. of extender oil (ASTM Type 101) was slowly stirred until smooth and then heated to 150° F. to form Solution 2.

(c) The two solutions were then emulsified in a pipeline Homo-Mixer by first circulating Solution 1 through the mixer and gradually adding Solution 2 to the water phase at the inlet to the mixer. Three tanks, one tank holding Solution 1, one holding Solution 2, and a discharge tank, properly connected by piping, were used. After all the ingredients constituting Solutions 1 and 2 were combined in the discharge tank, the emulsion was refined by repeated passes through the pipeline Homo-Mixer until the preponderant particle size of the dispersed phase was below 3 microns, as judged by color of the emulsion and observation of a 1:200 dilution of the emulsion with water under a microscope equipped with a measuring eyepiece. Time for first pass through the Homo-Mixer was one-half hour; time for refining the emulsion was 15 minutes.

Example 2.—Manufacture of Emulsion B

The operation as described in Example 1 was carried out using the following ingredients:

| Solution 1: | Lbs. |
|---|---|
| Water | 116.0 |
| Redicote E-1 | 9.3 |
| Acetic acid, glacial | 4.6 |

| Solution 2: | Lbs |
|---|---|
| Asphalt, 15 pen. | 232.0 |
| Extender oil, Type 101 | 23.2 |
| Xylene | 39.4 |
| Trichlorethylene | 37.2 |
| Anti-stripping agent (Redicote 2323) | 2.3 |

Example 3

Emulsion A and Emulsion B and blends of the two made at ratios of 70:30, 50:50, 30:70 were diluted with water at a rate of 1 part to 1 part of water and then spread on test plots of coarse soil as existing on gravel roads at a rate of 1.5 gallons per square yard.

Inspection of all the treated surfaces revealed a high degree of bonding of the aggregate and high degree of flexibility of the surface. The degree of flexibility corresponded to the amount of Emulsion A present in the products applied. Test specimens which were produced from a clay soil treated with each of the two emulsions and three emulsion blends of Example 3, each being diluted with three parts of water for each part of the emulsion or emulsion blend, withstood wind velocities in excess of 230 miles per hour both before and after an eight-hour exposure to simulated rainfall. The application rate of the diluted emulsion or emulsion blend was, in each case, one and one-half gallons per square yard. In comparing the results obtained with those of similar emulsions of coarse particle size it was seen that the depth of penetration as well as degree of bonding was highly satisfactory in all cases, while coarser emulsions gave tacky and uncoalesced surfaces.

Example 4

An emulsion produced as described in Example 1 was diluted at a ratio of 1 part emulsion to 3 parts water and applied at a rate of 1.5 gallons per square yard to a clay soil on a steep embankment which was previously landscaped to hold stepping stones forming a row of stairs. After the application of the emulsion, the stepping stones were placed on the soil. This treatment created a walkway which did not change its shape or lose its load-bearing strength even under conditions of heavy rain or periodic sprinkling with water.

In applying emulsion concentrate of Emulsion A or Emulsion B or blends thereof to soils, gravel roads or other surfaces, the concentrates are generally first diluted with water. Practical dilution ratios of concentrate of Emulsion A or Emulsion B or blends thereof with respect to water may range from 4:1 to about 1:20. The application rate of the diluted emulsion may range from about 0.25 to 2.5 gallons per square yard and may be higher.

In general, the thickness of the coating on individual soil particles depends on the rate of dilution with the more concentrated emulsions giving a thicker coating of the soil particles and a higher binder content in the soil. Depth of penetration, in general, depends on the application rate, i.e., the total amount of diluted emulsions applied per unit area which is treated.

Illustrative of the effectiveness of the emulsion bases on the stabilization of soils, according to my invention, is the following test: The resistance to erosion by wind was determined by exposing to a wind machine treated samples of soils slightly compacted and mounted at an angle of 20° to the horizontal. The resistance to erosion by wind was determined at various wind velocities. The wind machine has been described by R. M. White in the "Transactions of the American Association of Agricultural Engineers," vol. 12, No. 4, pp. 550–551 (1969). Other samples were also exposed to streams of water impinging on the surfaces of the samples in the form of a rain. These tests have been confirmed by actual field experience and are suitable to make a selection between various compositions as to their practical utility and service for the consolidation of soils. Samples were also prepared by agglomerating soils according to the procedure stated above, using emulsions of Composition 11 through 14. Composition 11, employing no elastomer, was an emulsion of extender oil type 101. Composition 12 was a similar emulsion which was prepared using the same oil as Composition 11 but including 3% of natural rubber latex. Composition 13 was a similar emulsion prepared using the same oil as in Composition 11, but containing 3% of random-oriented butadiene-styrene rubber. Composition 14 was prepared using an emulsion base according to Emulsion A, Example 1 supra. The results are tabulated below:

| | Wind resistant (m.p.h.)* | Water resistance (percent remaining)** | |
|---|---|---|---|
| | | At 10 min. | At 60 min. |
| Composition: | | | |
| #11 | 120–160 | 75 | 10 |
| #12 | 90–110 | 75 | 0 |
| #13 | 90 | 75 | 0 |
| #14 | >230 | 100 | 100 |

*The wind resistance indicates the maximum velocity of the wind at which the sample retained sufficient coherence so as to maintain its integrity as a sample.
**Water resistance (percent remaining) gives the percent of the sample which was not washed away after exposure to the rain of water on the sample after 10 minutes and after 60 minutes exposure.

The advantage of the block copolymer employed in the system of this invention, over low concentrations of natural rubber or butadiene-styrene rubber in oils is indicated by this test.

The following test illustrate the superiority of emulsions of the form of Emulsion B as compared with asphalt systems such as cut-back asphalts or other systems which rely only on thinning out of the asphalt by a volatile solvent such as kerosene.

Composition 15 was a hard asphalt cut back with kerosene.

Composition 16 was type B emulsion of the same composition as Composition 10 except that the content of asphalt, of extender oil type 101 and of Solprene were, respectively, 28.3, 19.7 and 2.0% by weight.

IDENTIFICATION OF SOLIDS IN ASPHALTIC PREPARATIONS

| Composition number | 15 | 16 |
|---|---|---|
| Viscosity at 77° F., MP: | | |
| 0.05/sec.⁻¹ | 41.5 | 3.48 |
| 0.001/sec.⁻¹ | 61 | 4.20 |
| Shear susceptibility | 0.20 | 0.05 |
| Penetration:[1] | | |
| Measured | 17 | 58 |
| Calculated [2] | (16) | (49) |
| Elastic recovery, percent of strain:[3] | | |
| 1 minute | 1.5 | 3.0 |
| 1 hour | 2.2 | 6.3 |
| Abrasion loss of aged Ottawa sand mix:[4] | | |
| Percent loss in 500 revolutions | [5] 100 | 32.3 |
| Mg. loss/revolution | 147.8 | 1.3 |

[1] ASTM D5-65.
[2] Calculated from viscosity at 77° by formula of Saal, Baas and Heukelom, J. Chem. Phys. 43 (1946) (J. Ph. Pfeiffer, editor, "The Properties of Asphaltic Bitumens," Elsevier Publishing, New York, 1950).
[3] Road Research Laboratory, Ministry of Transportation, RRL Report LR 14, Method of Szatkowski.
[4] According to test procedure described in "Properties of Highway Asphalts III, Influence of Chemical Composition," by Halstead, Rostler and White, Proceedings, Association of Asphalt Paving Technologists, Vol. 35, pp. 91–138 (1966).
[5] At 14 revolutions.

TEST RESULTS

| Composition | Brookfield viscosity at 77° F, as applied, cps. | Penetration into soil briquettes | | | Wind and water erosion [1] | | Load bearing capacity after 1 week, p.s.i.[2] | Solids, percent by wt. |
|---|---|---|---|---|---|---|---|---|
| | | Amount applied, g.s.y., concentrated | Time, min. | Depth, inch | Amount applied, g.s.y., concentrated | Test results | | |
| 15 | 60 | 0.17 | 1–2 | 0.30 | 0.40 | Fails 150 m.p.h. wind after passing 1 hr. rain. | 3 | 50 |
| 16 | 70 | 0.17 | 1–2 | 0–25 | 0.40 | Passes | 63 | 50 |

[1] Specimens cured 72 hours before testing.
[2] "Soiltest" pocket penetrometer CL-700.

I claim:

1. An aqueous emulsion containing a non-aqueous phase, said non-aqueous phase comprising a petroleum fraction substantially free of material boiling below about 300° F. at 760 mm. mercury pressure, resinous, unsaturated oily nitrogen bases, as determined by ASTM method 2006 said nitrogen bases being from about 5 to about 50% by weight of the sum of the petroleum fraction and said nitrogen bases, poly (styrene)-poly(diene)-poly-(styrene) or poly(styrene)-poly(acrylonitrile)-poly-(styrene) block copolymer, the ratio of the copolymer to the petroleum fraction being in the range of about 0.01 to 1 part by weight of the copolymer to 1 part by weight of the sum of said petroleum fraction and said nitrogen bases, and a volatile polar solvent for said petroleum fraction and said polymer; and a surfactant and water.

2. An emulsion according to claim 1 in which the non-aqueous phase contains a stiffening resin, which is from about 1 to about 3 parts by weight to 1 part by weight of the copolymer.

3. An emulsion according to claim 1 in which the polymer is a poly(styrene)-poly(butadiene)-poly-(styrene) block copolymer or mixtures of such copolymers, the weight ratio of the butadiene to styrene being in the range of 1:1 to 3:1.

4. An emulsion according to claim 3 in which the non-aqueous phase contains a stiffening resin, which is from about 1 to about 3 parts by weight to 1 part by weight of the copolymer.

5. An aqueous emulsion comprising a plurality of discrete non-aqueous phases, one of said non-aqueous phases being an oil phase comprising petroleum oil substantially free of asphaltenes and of material boiling below about 300° F. at 760 mm. mercury pressure, resinous, unsaturated nitrogen bases as determined by ASTM method 2006 and poly(styrene)-poly(diene)-poly(styrene) block copolymer, said copolymer having a diene:styrene ratio in the range of about 1:1 to about 3:1, said nitrogen bases being from about 5 to about 50% by weight of the sum of the petroleum oil and nitrogen bases, the ratio of said copolymer to said petroleum oil being of the range of 0.01 to 1 part by weight of said copolymer to 1 part by weight of said petroleum oil and another of said non-aqueous phases being an asphalt phase comprising an asphalt or an asphalt and fluxing agent and the aforesaid copolymer in from about 1 to about 15% by weight of said asphalt or the asphalt and fluxing agent and the asphalt or asphalt and fluxing agent containing said copolymer has a penetration at 77° F. from about 40 to about 120, a cationic surfactant and water, said oil phase being in the range of 30 to 70% of the mixed non-aqueous phases.

6. An emulsion according to claim 5 in which the polymer is a poly(styrene)-poly(butadiene)-poly(styrene) block copolymer or mixtures of such copolymers.

7. The emulsion of claim 5 in which each of the non-aqueous phases contains a volatile polar solvent for said petroleum oil and said asphalt.

References Cited
UNITED STATES PATENTS

| | | | |
|---|---|---|---|
| 2,537,190 | 1/1951 | Lankau | 260—28.5 AS |
| 2,509,777 | 5/1950 | McMillian | 260—28.5 AS |
| 3,592,788 | 7/1971 | Rostler | 260—28.5 AS |
| 3,556,819 | 1/1971 | Koons | 260—28.5 AS |
| 3,565,842 | 2/1971 | Pitchford | 260—28.5 AS |
| 3,337,987 | 8/1967 | Bennett | 260—28.5 B |
| 3,635,863 | 1/1972 | Drukker | 260—28.5 AS |
| 3,265,765 | 8/1966 | Holden | 260—28.5 B |
| 3,103,858 | 9/1963 | Lauren | 260—29.7 UA |
| 3,562,193 | 2/1971 | Leeks | 260—29.7 GP |
| 3,231,635 | 1/1966 | Holden | 260—28.5 B |

OTHER REFERENCES

H. Abraham, "Asphalts and Allied Substances," 5th edition, Vol. I, 1945, pp. 113, 250–253, 642.

ALLAN LIEBERMAN, Primary Examiner

P. R. MICHL, Assistant Examiner

U.S. Cl. X.R.

260—29.6 MH, 29.6 RB, 29.7 UA, 29.7 GP, 33.6 AQ; 404—76